United States Patent
Schroeder et al.

(10) Patent No.: US 11,724,339 B2
(45) Date of Patent: Aug. 15, 2023

(54) METHOD FOR PRODUCING A DRILL SHAFT FOR A WET DRILL BIT

(71) Applicant: Hilti Aktiengesellschaft, Schaan (LI)

(72) Inventors: Florian Schroeder, Maienfeld (CH); Christoph Weber, Oberaegeri (CH); Roland Schneider, Schlins (AT)

(73) Assignee: Hilti Aktiengesellschaft, Schaan (LI)

( * ) Notice: Subject to any disclaimer, the term of this patent is extended or adjusted under 35 U.S.C. 154(b) by 996 days.

(21) Appl. No.: 16/472,721

(22) PCT Filed: Nov. 28, 2017

(86) PCT No.: PCT/EP2017/080665
§ 371 (c)(1),
(2) Date: Jun. 21, 2019

(87) PCT Pub. No.: WO2018/114242
PCT Pub. Date: Jun. 28, 2018

(65) Prior Publication Data
US 2021/0129267 A1 May 6, 2021

(30) Foreign Application Priority Data
Dec. 23, 2016 (EP) .................................. 16206534

(51) Int. Cl.
| | |
|---|---|
| *E21B 10/44* | (2006.01) |
| *B23K 26/302* | (2014.01) |
| *B23D 65/00* | (2006.01) |
| *B21C 37/12* | (2006.01) |

(Continued)

(52) U.S. Cl.
CPC .......... *B23K 26/302* (2015.10); *B21C 37/122* (2013.01); *B23D 65/00* (2013.01); *E21B 10/44* (2013.01); *E21B 17/041* (2020.05); *B23K 2101/002* (2018.08)

(58) Field of Classification Search
CPC ... E21B 10/44; E21B 17/041; B23K 101/002; B23B 2251/408
See application file for complete search history.

(56) References Cited

U.S. PATENT DOCUMENTS

| | | |
|---|---|---|
| 1,795,380 A | 3/1931 | Stresau |
| 3,025,917 A | 3/1962 | Knoblauch |

(Continued)

FOREIGN PATENT DOCUMENTS

| | | |
|---|---|---|
| FR | 2 310 188 A1 | 12/1976 |
| JP | 57-177614 U | 11/1982 |

(Continued)

OTHER PUBLICATIONS

PCT/EP2017/080665, International Search Report dated Feb. 23, 2018 (Two (2) Pages).

(Continued)

*Primary Examiner* — Cathleen R Hutchins
(74) *Attorney, Agent, or Firm* — Crowell & Moring LLP

(57) ABSTRACT

A method for producing a drill shaft for a wet drill bit includes forming N, where N≥1, strip materials into a tubular body where the tubular body is integrally joined at strip edges of the strip materials by N connection welds. At least one strip material of the strip materials is provided with at least one recess before the integral joining of the strip edges.

4 Claims, 4 Drawing Sheets

(51) Int. Cl.
 *E21B 17/04* (2006.01)
 *B23K 101/00* (2006.01)

(56) References Cited

U.S. PATENT DOCUMENTS

| | | | | |
|---|---|---|---|---|
| 4,061,264 A | * | 12/1977 | Bartels | B23K 9/0325 |
| | | | | 228/145 |
| 4,727,943 A | * | 3/1988 | Wood | E21B 10/18 |
| | | | | 175/356 |
| 5,676,501 A | * | 10/1997 | Peetz | B23D 61/025 |
| | | | | 408/206 |

FOREIGN PATENT DOCUMENTS

| | | |
|---|---|---|
| JP | 8-303171 A | 11/1996 |
| JP | 11-320546 A | 11/1999 |

OTHER PUBLICATIONS

U.S. Patent Application, "Drill Bit Having a Spiral-Tube-Shaped Drill Shaft and Method for Producing a Spiral-Tube-Shaped Drill Shaft for a Drill Bit", filed Jun. 21, 2019, Inventor: Florian Schroeder et al.

U.S. Patent Application, "Core Bit Having a Spiral-Tube-Shaped Drill Shaft, and Method for Producing a Spiral-Tube-Shaped Drill Shaft for a Core Bit", filed Jun. 21, 2019, Inventor: Florian Schroeder et al.

\* cited by examiner

METHOD FOR PRODUCING A DRILL SHAFT FOR A WET DRILL BIT

CROSS REFERENCE TO RELATED APPLICATIONS

This application claims the priority of International Application No. PCT/EP2017/080665, filed Nov. 28, 2017, and European Patent Document No. 16206534.6, filed Dec. 23, 2016, the disclosures of which are expressly incorporated by reference herein.

BACKGROUND AND SUMMARY OF THE INVENTION

The present invention relates to a method for producing a drill shaft for a wet drill bit.

Drill bits consisting of a plurality of drill bit portions designed as a cutting portion and a drill shaft portion. The cutting portion comprises a ring portion and one or more cutting segments which are welded, soldered, or screwed to the ring portion or fixed to the ring portion by another suitable method of attachment. The drill shaft portion comprises a tubular drill shaft, a cover, and an insertion end by means of which the drill bit is fixed in the tool holder of a core drill. The drill shaft is made from a tubular material or from a flat strip material which is shaped into a tube and joined at the strip edges by means of longitudinal welding. The cutting portion and the drill shaft portion are joined, detachably or non-detachably, by means of a connecting device. In the case of drill bits with a non-detachable connecting device between the cutting portion and the drill shaft portion, the ring portion of the cutting portion and of the drill shaft may be designed monolithically, or alternatively the ring portion may be integrally joined to the drill shaft.

During the drilling operation a drill bit produces a drilled core having a core diameter and a borehole having a borehole diameter in a workpiece. The cutting segments form a cutting ring having an inner diameter that corresponds to the core diameter and an outer diameter that corresponds to the borehole diameter. In relation to drilling a distinction is made between wet drilling and dry drilling. Drill bits for wet drilling (wet drill bits) differ in structure from drill bits for dry drilling (dry drill bits). Wet drilling requires a cooling and flushing fluid, which as a cooling fluid cools the cutting segments of the drill bit and as a flushing fluid removes drilling cuttings from the borehole. Clean cooling and flushing fluid is generally added through an inner gap between the drilled core and the drill shaft, and used cooling and flushing fluid mixed with drilling cuttings is removed through an outer gap between the drill shaft and the borehole.

In order to transport sufficient cooling and flushing fluid to the machining point in the workpiece, when designing wet drill bits the inner gap, taking all permissible deviations into account, should as a rule have a width of at least 0.4 mm, whereby the width of the inner gap is also referred to as an inner protrusion. When wet drilling reinforced concrete, i.e., concrete with embedded reinforcing bars, iron wedges may form during the drilling, which are separated from the reinforcing bars by the wet drill bit and break off from the drilled core. The iron wedges may become wedged in the inner gap between the drill shaft and the drilled core, and cause the drilling process to be interrupted and the core drill to come to a standstill. In order to reduce the risk of iron wedges becoming wedged in the inner gap between the drilled core and the drill shaft, the inner protrusion should be limited to measurements of less than 0.4 mm, preferably less than 0.2 mm. The smaller the inner gap between the drilled core and the inside of the drill shaft, the lesser the risk of a separated iron wedge of a reinforcing iron bar becoming detached from the drilled core and penetrating the inner gap between the drilled core and the inside of the drill shaft.

In the case of wet drill bits with a small inner protrusion, in order to transport sufficient cooling and flushing fluid to the machining point in the workpiece the wet drill bits should be provided with transport channels for the cooling and flushing fluid. This has the disadvantage that producing transport channels for the cooling and flushing fluid on the inside of the drill shaft incurs high manufacturing costs.

The object of the present invention is to provide a method for producing a drill shaft for a wet drill bit by means of which transport channels for a cooling and flushing fluid can be produced on an inside of the drill shaft. At the same time the manufacturing costs for producing the drill shaft should be as low as possible.

The method for producing a drill shaft for a wet drill bit is, according to the invention, characterized in that at least one strip material of the N, N≥1 strip materials is provided with at least one recess before the integral joining of the strip edges. The drill shaft is made from one strip material (N=1) or a plurality of strip materials (N≥2), wherein the number of the strip materials used matches the number of connection welds. During the production of the drill shaft the strip materials are shaped into a tubular body and welded to the abutting strip edges. Producing the drill shaft by means of shaping and welding strip materials allows recesses to be produced on the inside of the drill shaft with low manufacturing costs, which serve as transport channels for the cooling and flushing fluid in the finished drill shaft. The recesses can be produced on an inside of the drill shaft, on an outside of the drill shaft, or on an outside and an inside of the drill shaft.

In a first preferred variant the N, N≥1 strip materials are shaped into a spiral-tube-shaped body and the spiral-tube-shaped body is integrally joined at the strip edges by means of N spiral-shaped connection welds. A drill shaft, designed as a welded spiral-tube-shaped body, has at least one spiral-shaped connection weld, which acts as a stiffening member for the drill shaft and increases the stiffness of the drill shaft compared with a tubular drill shaft having the same wall thickness. Alternatively, strip materials with lower wall thicknesses, which in the finished drill shaft are as stiff as a tubular drill shaft, can be used. Thus using a welded spiral-tube-shaped body as a drill shaft increases either the stiffness of the drill shaft during the drilling operation and/or reduces the weight of the drill shaft. A drill shaft with a higher degree of stiffness improves the stability of the drill shaft during drilling.

In a second preferred variant the N, N≥1 strip materials are shaped into a longitudinal tubular body and the longitudinal tubular body is integrally joined at the strip edges by means of N longitudinal connection welds. A drill shaft, designed as a welded longitudinal tubular body, has at least one longitudinal connection weld, which acts as a stiffening member for the drill shaft and increases the stiffness of the drill shaft compared with a tubular drill shaft having the same wall thickness. Alternatively, strip materials with lower wall thicknesses, which in the finished drill shaft are as stiff as a tubular drill shaft, can be used. Thus using a welded longitudinal tubular body as a drill shaft increases either the stiffness of the drill shaft during the drilling operation and/or reduces the weight of the drill shaft. A drill shaft with a higher degree of stiffness improves the stability of the drill shaft during drilling.

In a first preferred variant at least one tubular body recess is produced on an inside of the drill shaft. During the production of the drill shaft the strip materials are shaped into the tubular body and welded at the strip edges. Before the strip edges are welded, recesses are produced on the inside of the tubular body, which serve as transport channels for clean cooling and flushing fluid during the drilling operation. The number of the recesses and the geometry of the recesses can be adjusted according to the quantity of clean cooling and flushing fluid needed.

In a second preferred variant at least one tubular body recess is produced on an outside of the drill shaft. During the production of the drill shaft the strip materials are shaped into the tubular body and welded at the strip edges. Before the strip edges are welded, recesses are produced on the outside of the tubular body, which serve as transport channels for used cooling and flushing fluid mixed with drilling cuttings during the drilling operation.

In a third preferred variant at least one tubular body recess is produced on an inside of the drill shaft and at least one tubular body recess is produced on an outside of the drill shaft. During the production of the drill shaft the strip materials are shaped into the tubular body and welded at the strip edges. Before the strip edges are welded, recesses are produced on the inside and the outside of the tubular body. The recesses on the inside of the drill shaft serve as transport channels for clean cooling and flushing fluid, and the recesses on the outside of the drill shaft serve as transport channels for used cooling and flushing fluid mixed with drilling cuttings.

Exemplary embodiments of the invention are described below based on the drawings. This is not necessarily supposed to represent the exemplary embodiments to scale; rather, the drawings, where useful for explanatory purposes, are made in a schematic and/or slightly distorted form. At the same time it should be borne in mind that a wide variety of modifications and changes concerning the form and the details of an embodiment can be made without deviating from the general idea of the invention. The general idea of the invention is not limited to the exact form or the details of the preferred embodiment shown and described below or limited to subject-matter that would be restricted compared with the subject-matter claimed in the patent claims. For given ranges of measurements, values lying within the specified limits should also be disclosed as limit values and be able to be used and claimed at will. For the sake of simplicity the same reference numbers are used below for identical or similar parts, or parts with an identical or a similar function.

DETAILED DESCRIPTION OF THE DRAWINGS

Figure 1:
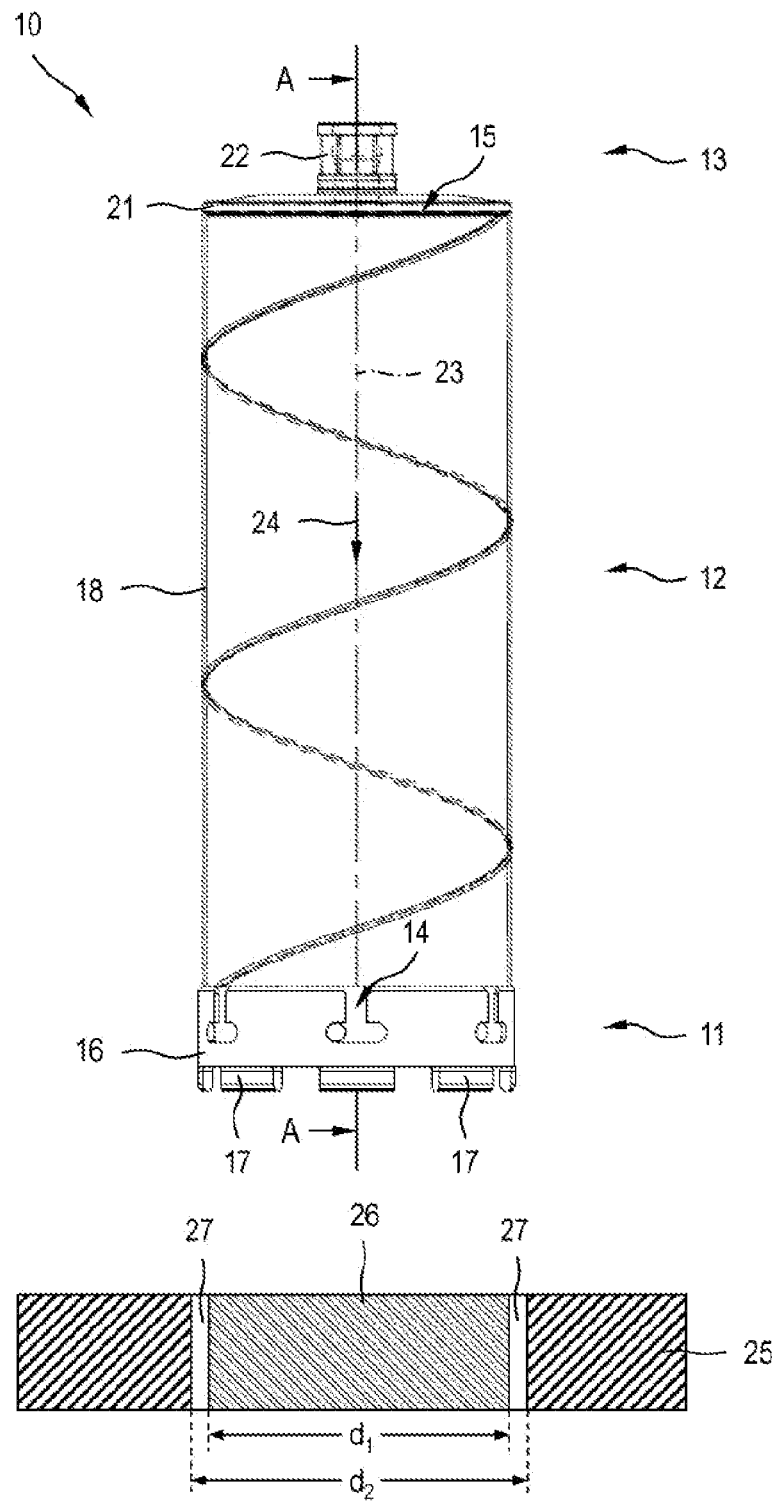
FIG. 1 shows a first embodiment of a wet drill bit with a spiral-tube-shaped drill shaft, which has been produced by means of the method according to the invention for producing a drill shaft with recesses on its inside.

FIG. 1 shows a first embodiment of a wet drill bit 10 with a spiral-tube-shaped drill shaft, which has been produced by means of the method according to the invention for producing a drill shaft with a plurality of recesses on its inside. The wet drill bit 10 is hereinafter referred to as the first wet drill bit 10; it comprises a cutting portion 11, a drill shaft portion 12 and a receiving portion 13, wherein the cutting portion 11 and the drill shaft portion 12 are joined by means of a first connecting device 14, and the drill shaft portion 12 and the receiving portion 13 are joined by means of a second connecting device 15.

The first connecting device 14 is designed in the exemplary embodiment as a detachable connecting device in the form of a combined plug-and-turn connection and the second connecting device 15 is designed in the exemplary embodiment as a non-detachable connecting device in the form of a welded joint. Alternatively, all detachable and non-detachable connecting devices are suitable for the first connecting device 14 between the cutting portion 11 and the drill shaft portion 12, and for the second connecting device 15 between the drill shaft portion 12 and the receiving portion 13. The first drill bit 10 can have detachable first and second connecting devices 14 and 15, a detachable first connecting device 14 and a non-detachable second connecting device 15, a non-detachable first connecting device 14 and a detachable second connecting device 15, or non-detachable first and second connecting devices 14 and 15. A connecting device is described as being detachable if the connection can be detached by the user without causing any destruction, for example a plug connection, a pin connection or a threaded connection. A connecting device is described as being non-detachable if the user can detach the connection only by causing destruction to the means of connection, for example a soldered joint, a welded joint or a bonded joint.

The cutting portion 11 comprises a ring portion 16 and a plurality of cutting segments 17, which are joined to the ring portion 16. The cutting segments 17 are arranged concentrically and form a cutting ring with intermediate spaces. Instead of a plurality of cutting segments 17, the cutting portion 11 may also have a single cutting segment designed as a closed cutting ring. The cutting segments 17 are welded, soldered or screwed to the ring portion 16 or fixed to the ring portion 16 by another suitable method of attachment. In the case of a non-detachable first connecting device 14, the ring portion 16 can be dispensed with and the cutting segments 17 can be joined directly to the drill shaft portion 12.

The drill shaft portion 12 comprises a spiral-tube-shaped drill shaft 18, which is joined to the cutting portion 11 by means of the first connecting device 14 and joined to the receiving portion 13 by means of the second connecting device 15. The receiving portion 13 comprises a cover 21 and an insertion end 22, which fixes the first wet drill bit 10 in a tool holder of a core drill. In the drilling operation the first wet drill bit 10 of the core drill is driven by a drilling axis 23 and moved in a drilling direction 24 parallel to the drilling axis 23 in a workpiece 25 that is to be machined. The first wet drill bit 10 produces a drilled core 26 having a core diameter $d_1$ and a borehole 27 having a borehole diameter $d_2$ in the workpiece. The cutting segments 17 form a cutting ring having an inner diameter that corresponds to the core diameter $d_1$ and an outer diameter that corresponds to the borehole diameter $d_2$.

Figures 2A, 2B:
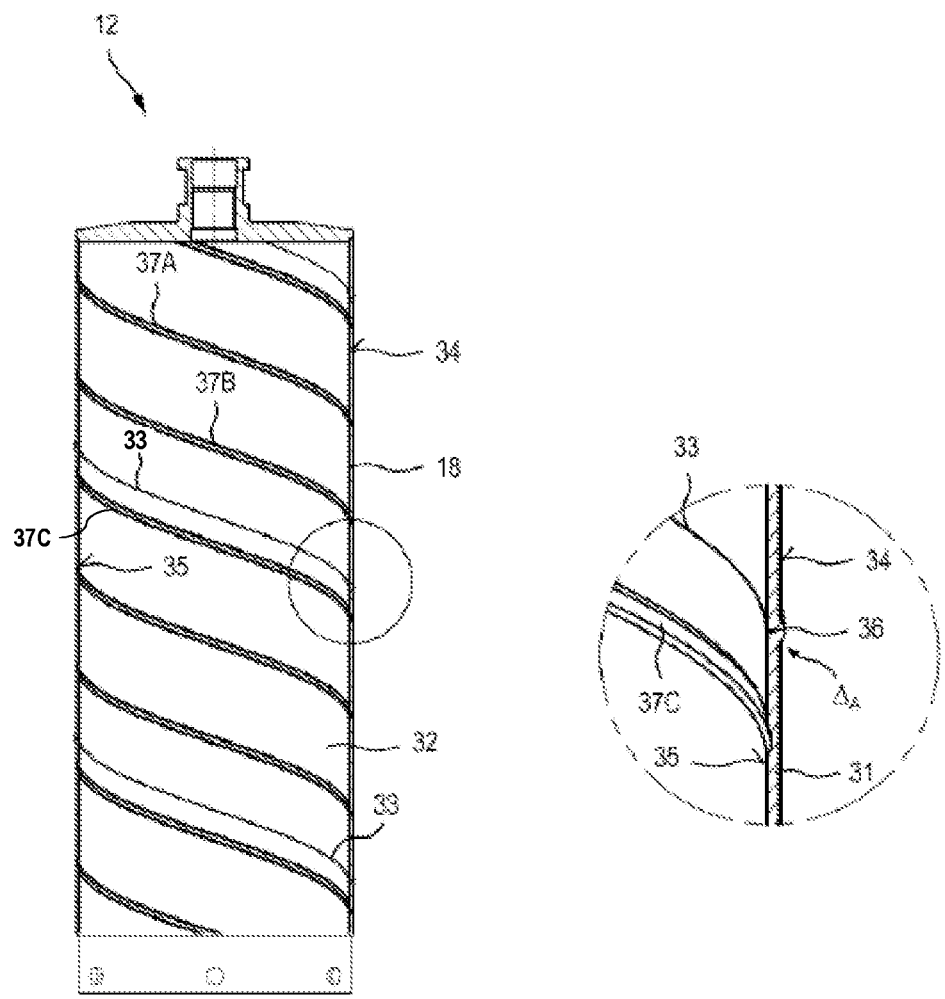
FIGS. 2A, 2B show a longitudinal section through the drill shaft of the first wet drill bit of FIG. 1 along the A-A intersection in FIG. 1B (FIG. 2A) as well as a detail of the drill shaft of FIG. 2A in an enlarged view (FIG. 2B)

FIGS. 2A and 2B show a longitudinal section through the drill shaft 18 of the first wet drill bit 10 of FIG. 1 along the A-A intersection in FIG. 1B (FIG. 2A) as well as a detail of the drill shaft 18 of FIG. 2A in an enlarged view (FIG. 2B).

The drill shaft 18 is designed as a welded spiral-tube-shaped body, which has been made from a strip material 31 in the form of a flat sheet by means of shaping and welding. The flat strip material 31 has been shaped into a spiral-tube-shaped body 32 and joined to the strip edges by means of a spiral-shaped connection weld 33. The spiral-shaped connection weld 33 acts as a stiffening member for the drill shaft 18 and increases the stiffness of the drill shaft 18 compared with a tubular drill shaft having the same wall thickness.

The spiral-shaped connecting weld 33 protrudes on an outside 34 of the drill shaft 18 having an outer protrusion $\Delta_A$ opposite the spiral-tube-shaped body 32 and is formed on an inside 35 of the drill shaft 18 essentially flush with the spiral-tube-shaped body 32. In order to produce the spiral-shaped connecting weld 33 protruding on the outside 34, a seam material 36 is used when welding the spiral-tube-shaped body 32 that provides the volume of the material that is needed.

The seam material 36 can be in the form of powder, wire or strips. The properties of the spiral-shaped connection weld 33 can be adjusted by means of the material properties of the seam material 36. The seam material 36 may have the same material properties as or different material properties to the strip material 31. If seam material 36 and strip material 31 have the same material properties, this results in a smooth transition when welding the strip edges and the seam material 36 can bind well with the strip material 31. Using seam material 36 that has a higher tensile strength and/or wear resistance than the strip material 31 enables the properties of the spiral-shaped connection weld 33 to be influenced so that guiding the drill shaft 18 over the spiral-shaped connection weld 33 is ensured as far as possible throughout the lifespan of the drill shaft 18.

The first wet drill bit 10 shows a spiral-shaped connection weld 33, which protrudes on the outside 34 of the drill shaft 18. The spiral-shaped connection weld 33 protruding on the outside 34 enables the drill shaft 18 to be guided over the borehole 27 when drilling with the first wet drill bit 10. Alternatively, the spiral-shaped connection weld 33 can protrude on the outside and inside 34 and 35 of the drill shaft 18 with an outer protrusion and inner protrusion of $\Delta_A$ and $\Delta_I$ or on the inside 35 of the drill shaft 18 with an inner protrusion $\Delta_I$ opposite the spiral-tube-shaped body 32. The protrusion of the spiral-shaped connection weld 33 is adjusted in such a way that the spiral-shaped connection weld 33 is, on the outside 34 of the drill shaft 18, in contact with the borehole 27 or, on the inside 35 of the drill shaft 18, in contact with the drilled core 26. As a result of the protruding spiral-shaped connection weld 33 the drill shaft 18 has a small contact surface with the borehole 27 or with the drilled core 26, and produces low friction. The lower the friction on the outside 34 between the drill shaft 18 and the borehole 27, or on the inside 35 between the drill shaft 18 and the drilled core 26, the greater the drilling progress of the first drill bit 10 upon an equal performance by the core drill, and the lifespan of the drill shaft 18 is increased.

Wet drilling with the first wet drill bit 10 requires a cooling and flushing fluid, which as a cooling fluid cools the cutting segments 17 and as a flushing fluid removes drilling cuttings from the borehole 27. The spiral-shaped connection weld 33 protruding on the outside 34 of the drill shaft may, in addition to guiding the drill shaft 18 over the borehole 27, facilitate the removal of used cooling and flushing fluid mixed with drilling cuttings. The spiral-shaped connection weld 33 acts as a conveyor for the used cooling and flushing fluid mixed with drilling cuttings if the direction of rotation of the first wet drill bit 10 and the direction of the spiral-shaped connection weld 33 on the outside 34 of the drill shaft 18 coincide.

For the purposes of adding clean cooling and flushing fluid to the inside 35 of the drill shaft 18, three recesses 37A, 37B and 37C are arranged on the inside 35 of the drill shaft 18, which are referred to as the first recess 37A, the second recess 37B and the third recess 37C. The recesses 37A, 37B and 37C are produced in the sheet before the shaping of the strip material 31 into the spiral tube 32 and serve as a transport channel for the necessary cooling and flushing fluid during the wet drilling with the first wet drill bit 10. The recesses 37A, 37B and 37C are particularly necessary in the case of a small inner gap between the drilled core 26 and the drill shaft 18. The number of the recesses 37A, 37B and 37C, the geometry of the recesses 37A, 37B and 37C and the layout of the recesses 37A, 37B and 37C on the outside 34 and/or the inside 35 of the drill shaft 18 can be adjusted according to the quantity of the cooling and flushing fluid.

The recesses 37A, 37B and 37C provided on the inside 35 of the drill shaft 18 are used to add clean cooling and flushing fluid and recesses provided on the outside 34 of the drill shaft 18 may facilitate the removal of used cooling and flushing fluid mixed with drilling cuttings. Since the recesses 37A, 37B and 37C for the first wet drill bit 10 are produced before the shaping of the strip material 31, recesses can be produced on the inside 35 of the drill shaft 18 with low manufacturing costs.

Figure 3:
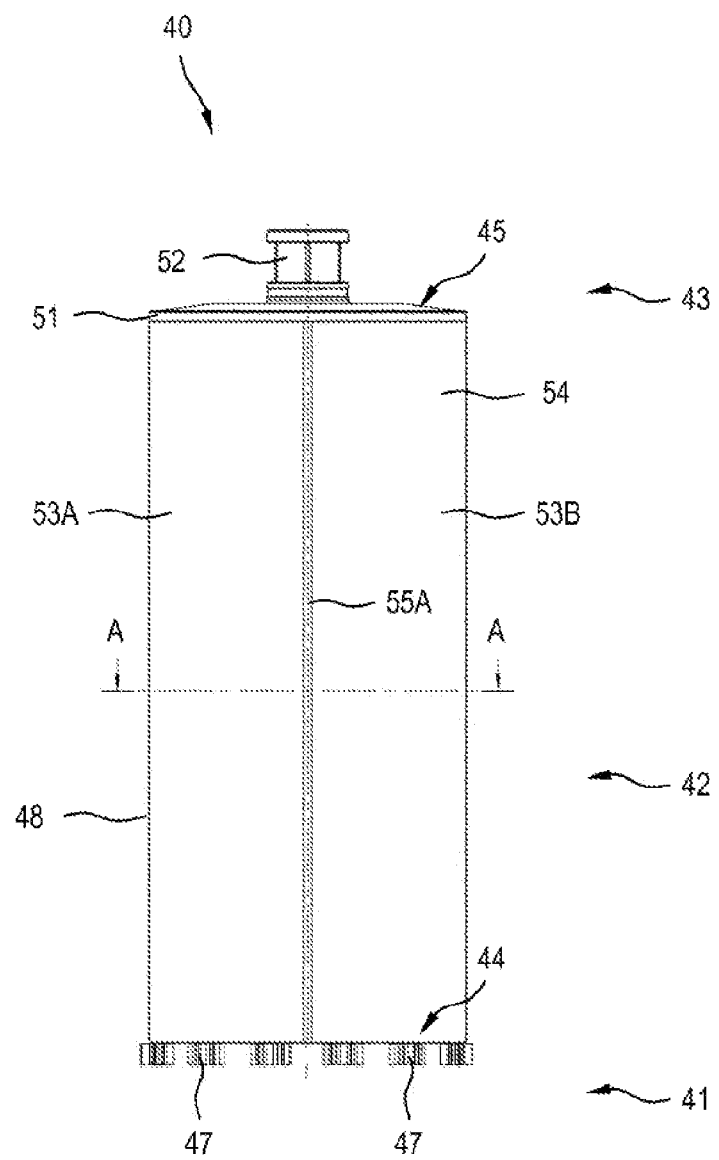
FIG. 3 shows a second embodiment of a wet drill bit with a longitudinally seam-welded drill shaft, which has been produced by means of the method according to the invention for producing a drill shaft with recesses on its outside and inside.

FIG. 3 shows a second embodiment of a wet drill bit 40 with a longitudinally seam-welded drill shaft, which has been produced by means of the method according to the invention for producing a drill shaft. The wet drill bit 40 is hereinafter referred to as the second wet drill bit 40; it comprises a cutting portion 41, a drill shaft portion 42 and a receiving portion 43, wherein the cutting portion 41 and the drill shaft portion 42 are joined by means of a first connecting device 44, and the drill shaft portion 42 and the receiving portion 43 are joined by means of a second connecting device 45.

The cutting portion 41 comprises a plurality of cutting segments 47, which form a cutting ring having an inner diameter that corresponds to the core diameter $d_1$ and an outer diameter that corresponds to the borehole diameter $d_2$. The drill shaft portion 42 comprises a longitudinally seam-welded drill shaft 48, which is joined to the cutting segments 47 by means of the first connecting device 44 and to the receiving portion 13 by means of the second connecting device 45. The receiving portion 43 comprises a cover 51 and an insertion end 52, which fixes the second wet drill bit 40 in a tool holder of a core drill.

The first and second connecting devices 44 and 45 are designed in the exemplary embodiment as non-detachable connecting devices in the form of a welded joint. In principle any first connecting device 44 that joins the cutting portion 41 and the drill shaft portion 42 to one another, detachably or non-detachably, and any second connecting device 45 that joins the drill shaft portion 42 and the receiving portion 43 to one another, detachably or non-detachably, is suitable.

The drill shaft 48 is designed in the form of a longitudinally seam-welded longitudinal tubular body and has been made from three strip materials 53A, 53B and 53C in the form of flat sheets by shaping and welding. The strip materials 53A, 53B and 53C have been shaped into a longitudinal tubular body 54 in a molding plant and integrally joined at the strip edges by means of three longitudinal connection welds 55A, 55B and 55C in a welding plant. The strip materials 53A, 53B and 53C are referred to as the first strip material 55A, the second strip material 55B and the third strip material 55C, and the connection welds are referred to as the first joining weld seam 55A, the second joining weld seam 55B and the third joining weld seam 55C. The first joining weld seam 55A joins the first and second strip materials 53A and 53B, the second joining weld seam 55B joins the second and third strip materials 53B and 53C, and the third joining weld seam 55C joins the first and third strip materials 53A and 53C.

The second wet drill bit 40 shows a cutting portion 41 with a plurality of cutting segments 47, which are non-detachably fixed to the drill shaft 48 by means of the first connecting device 44. Instead of a plurality of cutting segments 47, the cutting portion 41 may also have a single cutting segment designed as a closed cutting ring. In addition, the cutting portion 41 may have a ring portion, which is arranged between the cutting segments 47 and the drill shaft 48. The cutting segments 47 are welded, soldered or screwed to the ring portion or fixed to the ring portion by another suitable method of attachment, and the ring portion and the drill shaft 48 are joined, detachably or non-detachably, by means of the first connecting device 44. The ring portion may, like the drill shaft 48, be designed as a longitudinally seam-welded tube.

In the case of thin strip materials 53, however, using tubular ring portions with a constant wall thickness is recommended, since a larger contact surface is available for fixing the cutting segments 47.

Figure 4A:
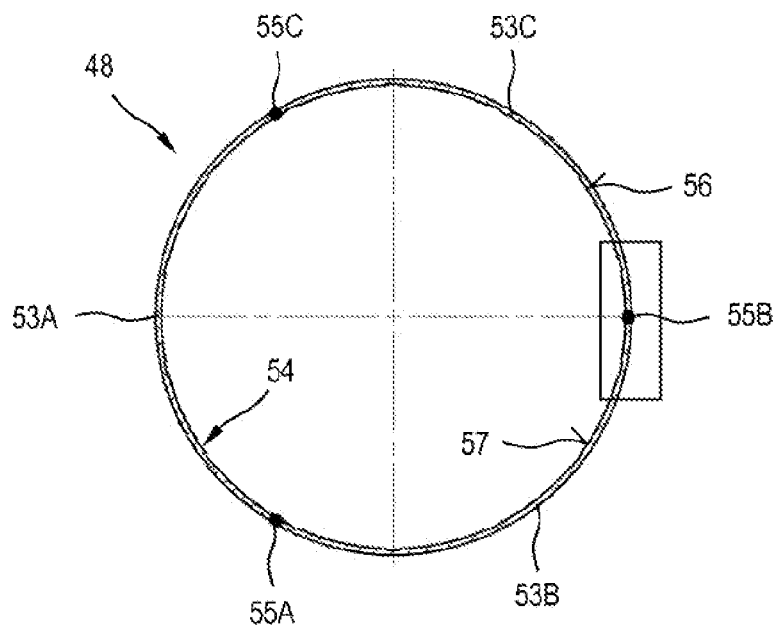
FIGS. 4A, 4B show a cross-section of the drill shaft of the second wet drill bit of FIG. 3 along the A-A intersection in FIG. 3 (FIG. 4A) as well as a detail of the drill shaft of FIG. 4A in an enlarged view (FIG. 4B).
Figure 4B:
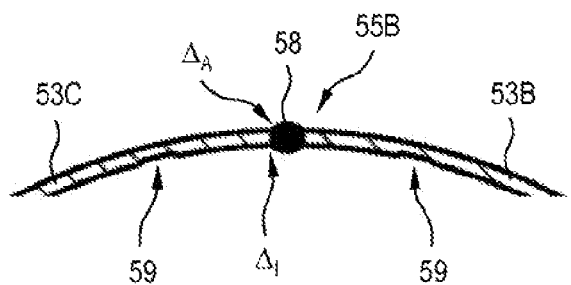

FIGS. 4A and 4B show a cross-section of the drill shaft 48 of the second wet drill bit 40 of FIG. 3 along the A-A intersection in FIG. 3 (FIG. 4A) as well as a detail of the drill shaft 48 of FIG. 4A in an enlarged view (FIG. 4B).

The longitudinal connection welds 55A, 55B and 55C of the drill shaft 48 are formed on an outside 56 of the drill shaft 46 essentially flush with the longitudinal tubular body 54 and protrude on an inside 57 of the drill shaft 48 with an inner protrusion $\Delta_I$ opposite the longitudinal tubular body 54. The longitudinal connection welds 55A, 55B and 55C protruding on the inside 57 of the drill shaft 48 enables the drill shaft 48 to be guided over the borehole 26 when drilling with the second wet drill bit 40. In order to produce the protruding longitudinal connection welds 55A, 55B and 55C, a seam material 58 is used when welding the longitudinal tubular body 54 that provides the volume of the material that is needed.

The seam material 58 can be in the form of powder, wire or strips. The properties of the connection welds 55A, 55B and 55C can be adjusted by means of the material properties of the seam material 58. The seam material 58 may have the same material properties as or different material properties to the strip materials 53A, 53B and 53C. If the seam material 58 and the strip materials 53A, 53B and 53C have the same material properties, this results in a smooth transition when welding the strip edges and the seam material 58 can bind well with the strip materials 53A, 53B and 53C. Using seam material 58 that has, for example, a higher tensile strength and/or wear resistance than the strip materials 53A, 53B and 53C enables the properties of the connection welds 55A, 55B and 55C to be influenced.

The second wet drill bit 40 shows a drill shaft 48 with connection welds 55A, 55B and 55C, which protrude on the outside and inside 56 and 57 of the drill shaft 48 opposite the longitudinal tubular body 54. Alternatively, the connection welds 55A, 55B and 55C can protrude on the outside 56 of the drill shaft 48 with the outer protrusion $\Delta_A$ or on the inside 57 of the drill shaft 48 with the inner protrusion $\Delta_I$ opposite the longitudinal tubular body 54. The protrusion of the connection welds 55A, 55B and 55C is adjusted in such a way that after the drilling the connection welds 55A, 55B and 55C are, on the outside 56 of the drill shaft 48, in contact with the borehole 27 or, on the inside 56 of the drill shaft 48, in contact with the drilled core 26.

Wet drilling with the second wet drill bit 40 requires a cooling and flushing fluid, which as a cooling fluid cools the cutting segments 47 and as a flushing fluid removes drilling cuttings from the borehole 27. For the purposes of adding clean cooling and flushing fluid to the inside 57 of the drill shaft 48, a plurality of recesses 59 are arranged on the inside 57 of the drill shaft 48. The recesses 59 are produced in the sheet before the shaping of the strip materials 53A, 53B and 53C into the longitudinal tubular body 54 and serve as a transport channel for the necessary cooling and flushing fluid during the wet drilling with the second wet drill bit 40. The recesses 59 are particularly necessary in the case of a small inner gap between the drilled core 26 and the drill shaft 48. The number of the recesses 59, the geometry of the recesses 59 and the layout of the recesses 59 on the outside 56 and/or the inside 57 of the drill shaft 48 can be adjusted according to the quantity of the cooling and flushing fluid.

The invention claimed is:

1. A method for producing a drill shaft for a wet drill bit, wherein the wet drill bit produces a borehole having a borehole diameter and a drilled core having a core diameter, comprising the steps of:
    forming N, wherein N≥1, strip materials into a tubular body by integrally joining respective strip edges of the strip materials by N connection welds; and
    providing at least one of the strip materials with at least one recess before the integrally joining, wherein the at least one recess is disposed a distance from the connection welds, wherein at least one of the at least one recess is provided on an inside of the tubular body, and wherein clean cooling and flushing fluid is transportable by the at least one of the at least one recess provided on the inside of the tubular body.

2. The method according to claim 1, wherein the tubular body is a spiral-tube-shaped body and wherein the connection welds are spiral-shaped connection welds.

3. The method according to claim 1, wherein the tubular body is a longitudinal tubular body and wherein the connection welds are longitudinal connection welds.

4. The method according to claim 1, wherein at least one of the at least one recess is provided on an outside of the tubular body and wherein used cooling and flushing fluid is transportable by the at least one of the at least one recess provided on the outside of the tubular body.

* * * * *